(12) United States Patent
Yagi et al.

(10) Patent No.: US 7,485,436 B2
(45) Date of Patent: Feb. 3, 2009

(54) METHOD OF STABILIZING OXIDATION COLOR FORMER

(75) Inventors: Yuji Yagi, Kyoto (JP); Tsuguki Komori, Gifu (JP)

(73) Assignee: Arkray, Inc., Kyoto (JP)

( * ) Notice: Subject to any disclaimer, the term of this patent is extended or adjusted under 35 U.S.C. 154(b) by 0 days.

(21) Appl. No.: 10/483,574

(22) PCT Filed: Oct. 9, 2002

(86) PCT No.: PCT/JP02/10465

§ 371 (c)(1),
(2), (4) Date: May 28, 2004

(87) PCT Pub. No.: WO03/033601

PCT Pub. Date: Apr. 24, 2003

(65) Prior Publication Data

US 2004/0205900 A1    Oct. 21, 2004

(30) Foreign Application Priority Data

Oct. 11, 2001    (JP) ............................. 2001-314219

(51) Int. Cl.
*C12Q 1/26* (2006.01)
(52) U.S. Cl. ....................................................... 435/25
(58) Field of Classification Search ................... 435/25, 435/4, 14, 23, 24; 548/250
See application file for complete search history.

(56) References Cited

U.S. PATENT DOCUMENTS

| 5,264,622 | A | | 11/1993 | Mizoguchi |
| 5,712,138 | A | * | 1/1998 | Kato et al. ................... 435/189 |
| 5,783,382 | A | * | 7/1998 | Aoyama et al. ................ 335/4 |
| 5,824,527 | A | * | 10/1998 | Kato et al. ................... 435/191 |
| 6,352,835 | B1 | * | 3/2002 | Komori et al. ................. 435/25 |
| 6,514,720 | B2 | * | 2/2003 | Komori et al. ................. 435/25 |

FOREIGN PATENT DOCUMENTS

| GB | 2 164 149 | | 3/1986 |
| WO | WO 9002339 | * | 3/1990 |

OTHER PUBLICATIONS

The Merck Index, 12th edition, p. 8726.*

* cited by examiner

*Primary Examiner*—Jon P Weber
*Assistant Examiner*—Bin Shen
(74) *Attorney, Agent, or Firm*—Hamre, Schumann, Mueller & Larson, P.C.

(57) ABSTRACT

A method of stabilizing an oxidation color former in a solution is provided. N-(carboxymethylaminocarbonyl)-4,4'-bis (dimethylamino) diphenylamine sodium salt as an oxidation color former is stabilized by providing it with at least one of a fructosyl amino acid oxidase (FAOD) and a peroxidase (POD) in the solution. The concentration of the FAOD is in the range from 0.01 to 1.0 g/l or 1 to 100 KU/l, and the concentration of the POD is in the range from 0.01 to 1.0 g/l or 1 to 100 KU/l.

25 Claims, 4 Drawing Sheets

METHOD OF STABILIZING OXIDATION COLOR FORMER

TECHNICAL FIELD

The present invention relates to a method of stabilizing an oxidation color former in a solution and an oxidation color former reagent using the method.

BACKGROUND ART

The use of N-(carboxymethylaminocarbonyl)-4,4'-bis (dimethylamino) diphenylamine sodium salt as a highly sensitive color former that develops color by oxidation has been known generally. Such a highly sensitive color former can be used, for example, when determining the amount of an oxidizing substance by causing a reaction between the color former and the oxidizing substance using an oxidoreductase and then measuring an amount of the color developed by measuring an absorbance. When N-(carboxymethyl aminocarbonyl)-4,4'-bis(dimethylamino)diphenylamine sodium salt is to be used in such a redox reaction, a solution prepared by dissolving it in water usually is used as a liquid reagent.

However, an oxidation color former such as N-(carboxymethylamino carbonyl)-4,4'-bis(dimethylamino)diphenylamine sodium salt is unstable in an aqueous solution and thus may develop color spontaneously within a day after the preparation of the aqueous solution. Therefore, when N-(carboxy methylaminocarbonyl)-4,4'-bis(dimethylamino)diphenylamine sodium salt stored as a solution is used, there arises a problem in that a background absorbance increases in the measurement of an absorbance, thereby degrading the accuracy of the measurement.

In order to prevent the influence of such spontaneous color development, it is necessary to prepare a liquid reagent for each measurement. However, this makes the operation complicated and results in high cost.

DISCLOSURE OF INVENTION

Therefore, it is an object of the present invention to provide a method of stabilizing an oxidation color former such as N-(carboxymethylamino carbonyl)-4,4'-bis(dimethylamino) diphenylamine sodium salt in a solution and a reagent using the method.

In order to achieve the above object, the present invention provides a method of stabilizing an oxidation color former in a solution, including: making at least one of a fructosyl amino acid oxidase (hereinafter referred to as "FAOD") and a peroxidase (hereinafter referred to as "POD") present with the oxidation color former in the solution. The oxidation color former may be, for example, N-(carboxymethylaminocarbonyl)-4,4'-bis(dimethylamino) diphenylamine sodium salt.

When at least one of the FAOD and the POD is present with the oxidation color former in the solution, spontaneous color development of the oxidation color former such as N-(carboxymethylaminocarbonyl)-4,4'-bis(dimethylamino)diphenylamine sodium salt can be suppressed, although the mechanism is unknown. This allows the oxidation color former to be stored as a solution, for example. Therefore, the necessity of preparing a liquid reagent for each measurement is eliminated, which allows measurement or the like to be carried out simply and at low cost. Moreover, when the stored solution is used as a reagent causing a color-developing reaction, an increase in background absorbance in the measurement of an absorbance is suppressed so that the accuracy of the measurement can be improved.

In the method of the present invention, it is preferable that the concentration of the oxidation color former is in a range from 1 to 10,000 μmol/l.

In the method of the present invention, the concentration of the FAOD preferably is in a range from 0.002 to 200 g/l or 0.1 to 1000 KU/l, and the concentration of the POD preferably is in a range from 0.02 to 50 g/l or 1 to 5000 KU/l.

In the method of the present invention, the amount of the FAOD preferably is in a range from 0.01 to 200 g or 0.5 to 1000 KU per 0.1 mmol of the oxidation color former, and the amount of the POD preferably is in a range from 0.02 to 50 g or 1 to 5000 KU per 0.1 mmol of the oxidation color former. When both the enzymes are added, preferably they are added so that the amount of the FAOD is in a range from 0.01 to 100 g or 0.5 to 600 KU while the amount of the POD is in a range from 0.02 to 50 g or 1 to 5000 KU.

In the method of the present invention, it is preferable that the solution contains at least one buffer selected from the group consisting of ADA buffer, Tris-HCl buffer, Bis-Tris buffer, glycylglycine buffer, Bicine buffer, and phosphate buffer because this allows the spontaneous color development to be suppressed more strongly.

In the method of the present invention, it is preferable that at least one antioxidant selected from the group consisting of α-tocopherol acetate (VE), potassium erythorbate, and potassium sorbate; at least one chelating agent selected from the group consisting of ethylenediaminetetraacetic acid (EDTA), diethylenetriaminepentaacetic acid (DTPA), trans-1,2-diaminocyclohexane-N, N,N',N'-tetraacetic acid (CyDTA), O,O'-bis (2-aminoethyl)ethyleneglycol-N,N,N',N'-tetraacetic acid (GEDTA), and nitrilotriacetic acid (NTA); sodium azide; or the like further is present with the oxidation color former. The spontaneous color development of the oxidation color former can be suppressed still more strongly by the presence of these substances. One kind of these substances may be present with the oxidation color former, or two or more kinds may be present with the oxidation color former.

Next, an oxidation color former reagent according to the present invention is a reagent solution including an aqueous solvent and an oxidation color former dissolved in the aqueous solvent, and at least one of FAOD and POD further is dissolved in the aqueous solvent. The oxidation color former may be, for example, N-(carboxymethylaminocarbonyl)-4, 4'-bis (dimethylamino)diphenylamine sodium salt as in the above.

In such a reagent, spontaneous color development of the oxidation color former such as N-(carboxymethylaminocarbonyl)-4,4'-bis (dimethylamino)diphenylamine sodium salt is suppressed when the reagent is held or stored. Therefore, the necessity of preparing a reagent for each use is eliminated so that various measurement reactions or the like using N-(carboxymethylaminocarbonyl)-4,4'-bis(dimethylamino) diphenylamine sodium salt, for example, can be carried out simply.

BEST MODE FOR CARRYING OUT THE INVENTION

Figure 1:
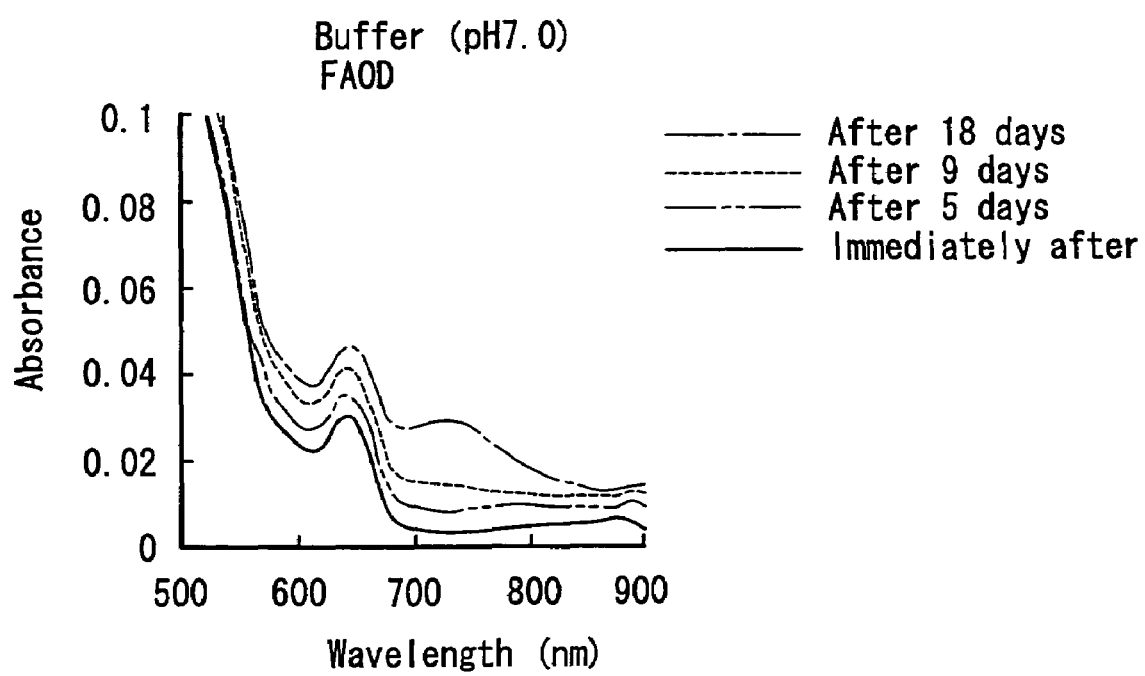
FIG. 1 is a graph showing an absorbance spectrum of DA-64 when FAOD is present with the DA-64 in a buffer in one example of a stabilizing method according to the present invention.

Hereinafter, the method of the present invention will be described in detail with reference to the following examples, in which N-(carboxymethyl aminocarbonyl)-4,4'-bis(dimethylamino)diphenylamine sodium salt is used as an oxidation color former.

The stabilization of N-(carboxymethylaminocarbonyl)-4,4'-bis (dimethylamino)diphenylamine sodium salt according to the present invention can be carried out, for example, by dissolving N-(carboxymethylamino carbonyl)-4,4'-bis(dimethylamino)diphenylamine sodium salt and at least one of FAOD and POD in an aqueous solvent to prepare an aqueous solution of N-(carboxymethylaminocarbonyl)-4,4'-bis (dimethylamino)diphenylamine sodium salt.

As the FAOD, an enzyme catalyzing a reaction represented by Formula (1) below may be used, and the derivation thereof is not particularly limited. For example, commercially available enzyme such as a product named FAOX-E (Kikkoman Corporation) and a product named FOD (Asahi Chemical Industry Co., Ltd.) can be used.

$$R^1—CO—CH_2—NH—R^2+H_2O+O_2 \rightarrow R^1—CO—CHO+NH_2—R^2+H_2O_2 \quad (1)$$

In Formula (1), $R^1$ denotes a hydroxyl group or a residue derived from the sugar before glycation (i.e., sugar residue). The sugar residue ($R^1$) is an aldose residue when the sugar before glycation is aldose, and is a ketose residue when the sugar before glycation is ketose. For example, when the sugar before glycation is glucose, it takes a fructose structure after glycation by an Amadori rearrangement. In this case, the sugar residue ($R^1$) becomes a glucose residue (an aldose residue). This sugar residue ($R^1$) can be represented, for example, by $$—[CH(OH)]_n—CH_2OH$$

where n is an integer of 0 to 6.

In Formula (1), $R^2$ is not particularly limited. However, when the substrate is a glycated amino acid, a glycated peptide, or a glycated protein, for example, there is a difference between the case where an α-amino group is glycated and the case where an amino group other than the α-amino group is glycated.

In Formula (1), when an α-amino group is glycated, $R^2$ is an amino acid residue or a peptide residue represented by Formula (2) below.

$$—CHR^3—CO—R^4 \quad (2)$$

In Formula (2), $R^3$ denotes an amino-acid side chain group. $R^4$ denotes a hydroxyl group, an amino acid residue, or a peptide residue, and can be represented, for example, by Formula (3) below. In Formula (3), n is an integer of 0 or more, and $R^3$ denotes an amino-acid side chain group as in the above.

$$—(NH—CHR^3—CO)_n—OH \quad (3)$$

In Formula (1), when an amino group other than the α-amino group is glycated (i.e., an amino-acid side chain group is glycated), $R^2$ can be represented by Formula (4) below.

$$—R^5—CH(NH—R^6)—CO—R^7 \quad (4)$$

In Formula (4), $R^5$ denotes a portion other than the glycated amino group in the amino-acid side chain group. For example, when the glycated amino acid is lysine, $R^5$ is as follows.

$$—CH_2—CH_2—CH_2—CH_2—$$

For another example, when the glycated amino acid is arginine, $R^5$ is as follows.

$$—CH_2—CH_2—CH_2—NH—CH(NH_2)—$$

In Formula (4), $R^6$ denotes hydrogen, an amino acid residue, or a peptide residue, and can be represented, for example, by Formula (5) below. In Formula (5), n denotes an integer of 0 or more, and $R^3$ denotes an amino-acid side chain group as in the above.

$$—(CO—CHR^3—NH)_n—H \quad (5)$$

In Formula (4), $R^7$ denotes a hydroxyl group, an amino acid residue, or a peptide residue, and can be represented, for example, by Formula (6) below. In Formula (6), n is an integer of 0 or more, and $R^3$ denotes an amino-acid side chain group as in the above.

$$—(NH—CHR^3—CO)_n—OH \quad (6)$$

As the POD, a known POD catalyzing a reaction represented by Formula (7) below can be used. In Formula (7), $AH_2$ denotes a substrate and A is not particularly limited.

$$AH_2+H_2O_2 \rightarrow A+2H_2O \quad (7)$$

The concentration of N-(carboxymethylaminocarbonyl)-4,4'-bis (dimethylamino)diphenylamine sodium salt in the aqueous solution is not particularly limited, but is, for example, in the range from 1 to 10,000 μmol/l, preferably 1 to 1000 μmol/l as described above, due to the solubility of N-(carboxymethylaminocarbonyl)-4,4'-bis(dimethylamino) diphenylamine sodium salt in water, etc.

When FAOD is added, its concentration is, for example, in the range from 0.002 to 200 g/l, preferably 0.01 to 50 g/l, and more preferably 0.3 to 20 g/l, as described above. When indicated by enzyme activity, it is, for example, in the range from 0.1 to 1000 KU/l, preferably 0.5 to 300 KU/l, and more preferably 1 to 150 KU/l. Furthermore, the amount of FAOD per 0.1 mmol of N-(carboxymethylaminocarbonyl)-4,4'-bis (dimethylamino)diphenylamine sodium salt is, for example, in the range from 0.01 to 200 g, preferably 0.1 to 50 g, and more preferably 0.6 to 20 g. When indicated by enzyme activity, it is, for example, in the range from 0.5 to 1000 KU, preferably 1 to 300 KU, and more preferably 2 to 100 KU.

When POD is added, its concentration is, for example, in the range from 0.02 to 50 g/l, preferably 0.2 to 10 g/l, as described above. When indicated by enzyme activity, it is, for example, in the range from 1 to 5000 KU/l, preferably 5 to 1000 KU/l. Furthermore, the amount of POD per 0.1 mmol of N-(carboxymethylaminocarbonyl)-4,4'-bis(dimethylamino) diphenylamine sodium salt is, for example, in the range from 0.02 to 50 g, preferably 0.2 to 10 g. When indicated by enzyme activity, it is, for example, in the range from 1 to 5000 KU, preferably 5 to 1000 KU.

Alternatively, both FAOD and POD may be added. In this case, FAOD and POD are added so that, for example, the FAOD concentration is in the range from 0.002 to 100 g/l while the POD concentration is in the range from 0.02 to 50 g/l, preferably the FAOD concentration is in the range from 0.01 to 50 g/l while the POD concentration is in the range from 0.2 to 10 g/l, and more preferably the FAOD concentration is in the range from 0.3 to 20 g/l while the POD concentration is in the range from 0.2 to 10 g/l. When indicated by enzyme activity, they are added so that, for example, the FAOD concentration is in the range from 0.1 to 600 KU/l while the POD concentration is in the range from 1 to 5000 KU/l, preferably the FAOD concentration is in the range from 0.5 to 300 KU/l while the POD concentration is in the range from 5 to 1000 KU/l, and more preferably the FAOD concentration is in the range from 1 to 150 KU/l while the POD concentration is in the range from 5 to 1000 KU/l.

The amounts of FAOD and POD per 0.1 mmol of N-(carboxymethyl aminocarbonyl)-4,4'-bis(dimethylamino)diphenylamine sodium salt are, for example, as follows: the amount of FAOD is in the range from 0.01 to 100 g while the amount of POD is in the range from 0.02 to 50 g, preferably the amount of FAOD is in the range from 0.1 to 50 g while the amount of POD is in the range from 0.2 to 10 g, and more preferably the amount of FAOD is in the range from 0.6 to 20 g while the amount of POD is in the range from 0.2 to 10 g. When indicated by enzyme activity, they are as follows, for example: the amount of FAOD is in the range from 0.5 to 600 KU while the amount of POD is in the range from 1 to 5000 KU, preferably the amount of FAOD is in the range from 1 to 300 KU while the amount of POD is in the range from 5 to 1000 KU, and more preferably the amount of FAOD is in the range from 2 to 100 KU while the amount of POD is in the range from 5 to 1000 KU.

Furthermore, FAOD (A) and POD (B) are added so that they are present at a weight ratio (A:B), for example, in the range from 100:0 to 0:100.

As the aqueous solvent, water, various buffers, and the like can be used, for example. Among these, various buffers are preferable because spontaneous color development of N-(carboxymethylaminocarbonyl)-4,4'-bis(dimethylamino)diphenylamine sodium salt can be suppressed more strongly. Examples of the buffer include ADA buffer, Tris-HCl buffer, Bis-Tris buffer, glycylglycine buffer, Bicine buffer, and a phosphate buffer such as potassium phosphate buffer (KPB) as described above, and HEPES buffer, HEPSO buffer, and the like. Among these, ADA buffer, Tris-HCl buffer, and phosphate buffer are preferable. The pH of the buffer is, for example, in the range from 5.0 to 9.0, preferably 6.0 to 8.0.

The concentration of the buffer is not particularly limited, and is, for example, in the range from 1 to 1000 mmol/l. However, preferably it is in the range from 50 to 800 mmol/l, more preferably 100 to 500 mmol/l, because spontaneous color development of N-(carboxymethylaminocarbonyl)-4,4'-bis(dimethylamino)diphenylamine sodium salt can be suppressed more strongly when the concentration of the buffer is relatively high.

Furthermore, the pH of the aqueous solution prepared is not particularly limited, but is, for example, in the range from 5.0 to 9.0, preferably 6.0 to 8.0.

Such an aqueous solution of N-(carboxymethylaminocarbonyl)-4,4'-bis(dimethylamino)diphenylamine sodium salt can be stabilized when at least one of FAOD and POD is present with N-(carboxymethylaminocarbonyl) -4,4'-bis (dimethylamino)diphenylamine sodium salt. Thus, it becomes possible to store N-(carboxymethylaminocarbonyl)-4,4'-bis(dimethylamino) diphenylamine sodium salt as a solution. The storage temperature is not particularly limited, but is, for example, in the range from 0° C. to 40° C., preferably 0° C. to 25° C., and more preferably 0° C. to 10° C.

When the aqueous solution is stored at 10° C. without adding either FAOD or POD, the absorbance measured at 727 nm as the absorption wavelength of N-(carboxymethylaminocarbonyl)-4,4'-bis(dimethylamino) diphenylamine sodium salt that has developed color increases, for example, by a factor of 2 to 3 after the storage for 5 days and by a factor of 10 to 11 after the storage for 18 days. In contrast, when the aqueous solution stabilized by the method of the present invention is stored at 10° C., the spontaneous color development can be suppressed, for example, for 9 days, preferably for 1 to 5 days.

Furthermore, in the method of the present invention, not only FAOD and POD, but also an antioxidant, a chelating agent, sodium azide, and the like as described above may be present with the oxidation color former. Among these, a chelating agent and sodium azide are preferable.

Examples of the antioxidant include VE, potassium erythorbate, and potassium sorbate as described above. The antioxidant is added so that its concentration falls in the range from, for example, 0.1 to 1000 µmol/l, preferably 0.2 to 100 µmol/l, and more preferably 0.5 to 20 µmol/l. Furthermore, the amount of the antioxidant is in the range from, for example, 0.1 to 100 µmol, preferably 0.2 to 20 µmol per 0.1 mmol/l of N-(carboxymethyl aminocarbonyl)-4,4'-bis(dimethylamino)diphenylamine sodium salt.

Examples of the chelating agent include EDTA, DTPA, CyDTA GEDTA, and NTA as described above. The chelating agent is added so that its concentration falls in the range from, for example, 0.01 to 20 mmol/l, preferably 0.05 to 10 mmol/l, and more preferably 0.1 to 5 mmol/l. Furthermore, the amount of the chelating agent is in the range from, for example, 0.02 to 15 mmol, preferably 0.05 to 10 mmol, and more preferably 0.1 to 5 mmol per 0.1 mmol of N-(carboxymethylaminocarbonyl)-4,4'-bis(dimethylamino)diphenylamine sodium salt.

Sodium azide is added so that its concentration falls in the range from, for example, 0.01 to 20 mmol/l, preferably 0.05 to 10 mmol/l, and more preferably 0.1 to 5 mmol/l. Furthermore, the amount of sodium azide is in the range from, for example, 0.01 to 10 mmol, preferably 0.05 to 5 mmol, and more preferably 0.1 to 2 mmol per 0.1 mmol of N-(carboxymethylamino carbonyl)-4,4'-bis(dimethylamino)diphenylamine sodium salt.

N-(carboxymethylaminocarbonyl)-4,4'-bis(dimethylamino) diphenylamine sodium salt stabilized in the above-described manner is useful as a liquid reagent because the spontaneous color development is suppressed as described above even if it is stored as a solution for a long time. The application of the N-(carboxymethylaminocarbonyl)-4,4'-bis (dimethylamino) diphenylamine sodium salt reagent is not particularly limited. For example, the reagent may be used as a color-developing substrate in a redox reaction or the like as described above. When the reagent is used in such a reaction, an increase in background absorbance in the measurement of an absorbance is suppressed because the spontaneous color development is suppressed as described above. Therefore, the reagent can improve the accuracy of various measurements. Moreover, as in the stabilizing method of the present invention, it also is preferable to add various buffers, an antioxidant, a chelating agent, sodium azide, and the like to the reagent.

EXAMPLES

Examples 1 to 3 and Comparative Example 1

In Examples 1 to 3, N-(carboxymethylaminocarbonyl)-4,4'-bis (dimethylamino)diphenylamine sodium salt was present with at least one of FAOD and POD in Tris-HCl buffer, and the stability (change in absorbance) of the solution was examined.

First, N-(carboxymethylaminocarbonyl)-4,4'-bis(dimethylamino) diphenylamine sodium salt (product name DA-64, manufactured by Wako Pure Chemical Industries, Ltd., hereinafter referred to as "DA-64") was added to 200 mM Tris-HCl buffer (pH 7.0) so that its concentration became 0.088 mM. Then, by adding FAOD (product name FOD, manufactured by Asahi Chemical Industry Co., Ltd.) and/or POD (manufactured by Toyobo Co., Ltd.) to the thus-obtained DA-64 solution, samples containing the FAOD and/or the POD at the following concentrations were prepared. The absorption spectrum was measured with a biochemical automatic analysis apparatus (product name JCA-BM 8, manufactured by Japan Electron Optics Laboratory Co. Ltd.) after storing the samples at 10° C. for predetermined periods (immediately after the preparation, 5 days, 9 days, and 18 days). On the other hand, in Comparative Example 1, a sample was prepared in the same manner as in Examples 1 to 3 except that neither FAOD nor POD was added, and the absorption spectrum was measured also in the same manner.

|  | FAOD Concentration | POD Concentration |
|---|---|---|
| Example 1 | 0.09 g/l (22 KU/l) | — |
| Example 2 | — | 0.37 g/l (15 KU/l) |
| Example 3 | 0.09 g/l (22 KU/l) | 0.37 g/l (15 KU/l) |
| Comparative Example 1 | — | — |

Figure 2:
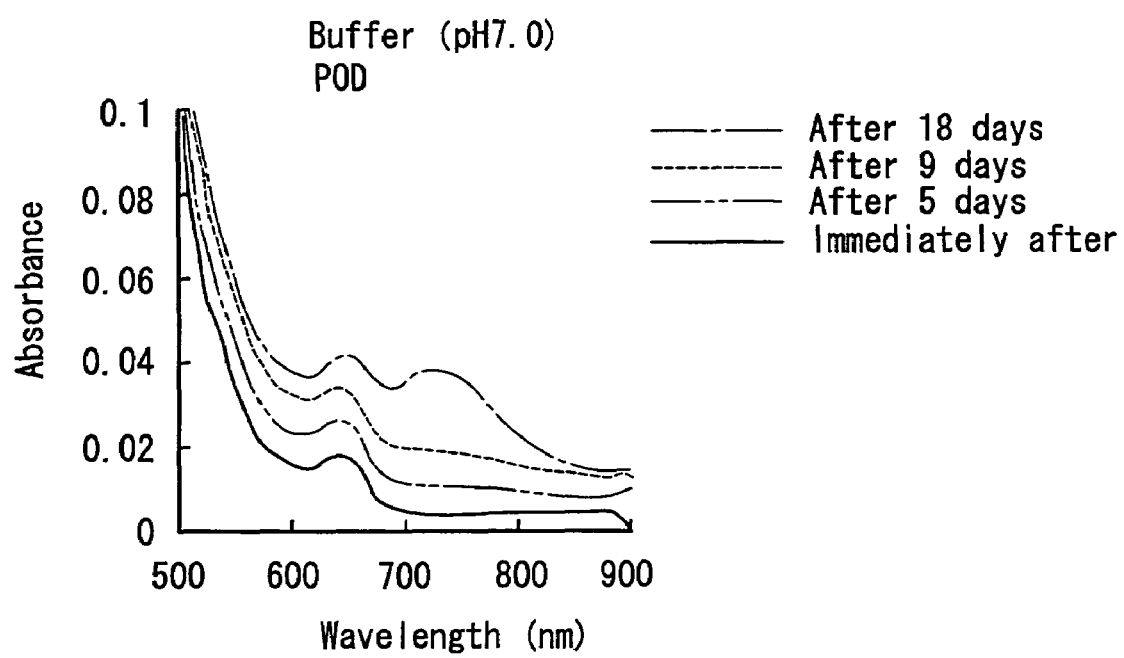
FIG. 2 is a graph showing an absorbance spectrum of DA-64 when POD is present with the DA-64 in a buffer in another example of a stabilizing method according to the present invention.
Figure 3:
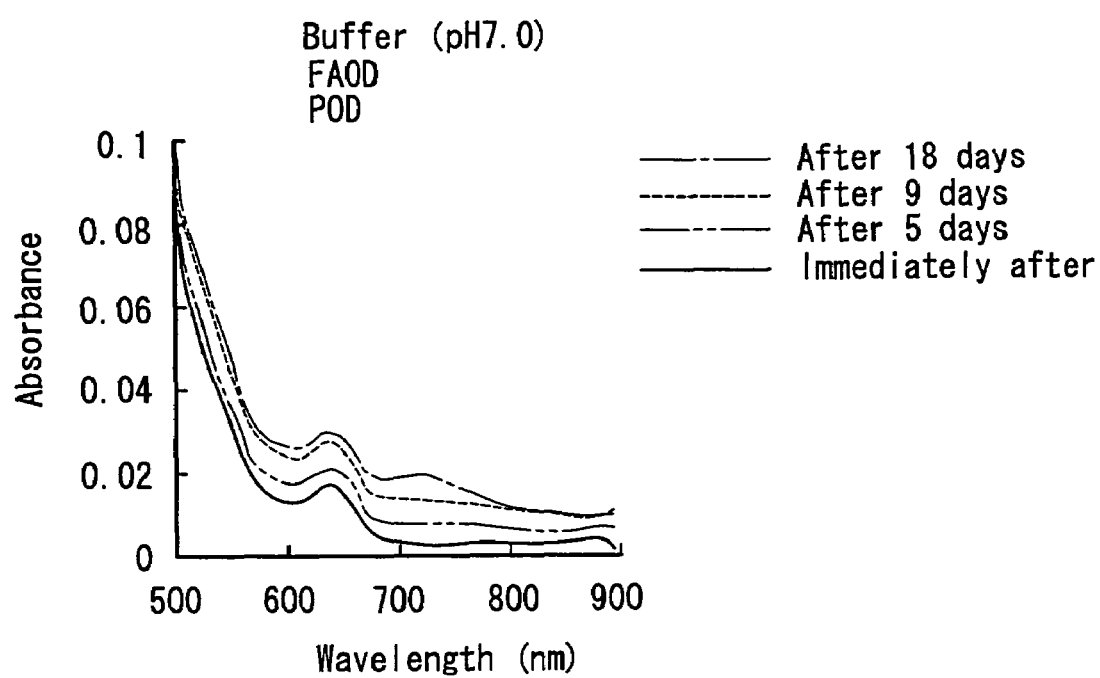
FIG. 3 is a graph showing an absorbance spectrum of DA-64 when FAOD and POD are present with the DA-64 in a buffer in still another example of a stabilizing method according to the present invention.
Figure 4:
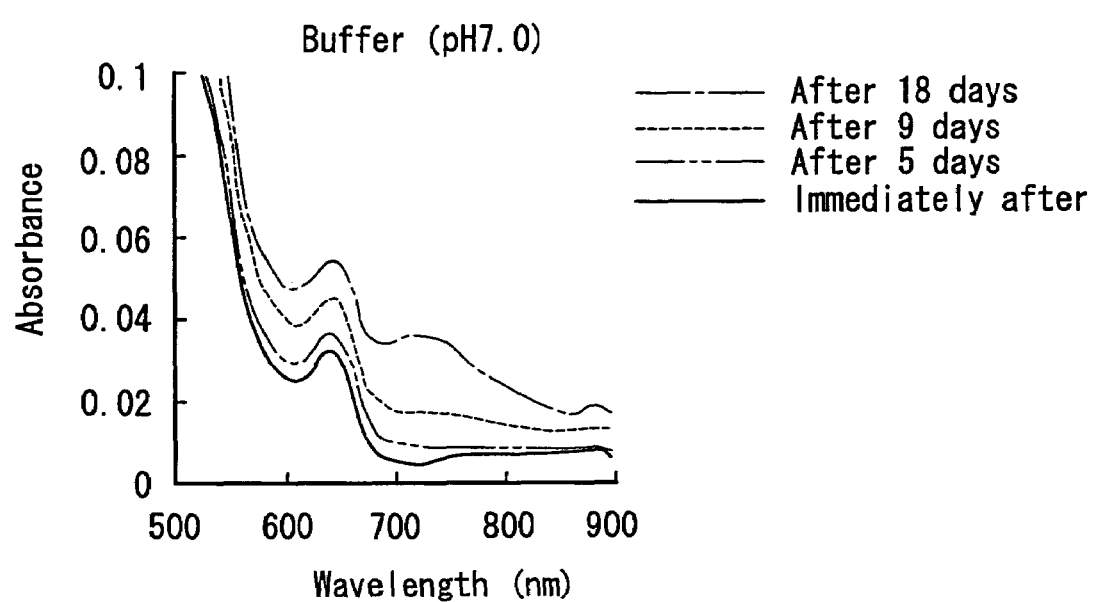
FIG. 4 is a graph showing an absorbance spectrum of DA-64 in a buffer in a comparative example.

The results are shown in FIGS. 1 to 4. FIGS. 1 to 4 are graphs showing the absorption spectrum measured after the storage for each predetermined period, wherein FIG. 1 shows the data of Example 1, FIG. 2 shows the data of Example 2, FIG. 3 shows the data of Example 3, and FIG. 4 shows the data of Comparative Example 1.

As can be seen from the drawings, in Examples 1 to 3 where at least one of the FAOD and POD was added, an increase in absorbance measured at 727 nm as the absorption wavelength of DA-64 that had developed color was suppressed to about ½ to ¹⁄₁₀ of that in Comparative Example 1. In particular, in Example 3 where both the FAOD and POD were added, the spontaneous color development was suppressed most significantly.

INDUSTRIAL APPLICABILITY

As specifically described above, according to a method of the present invention, an oxidation color former such as N-(carboxymethylamino carbonyl)-4,4'-bis(dimethylamino) diphenylamine sodium salt can be stored stably as a solution. Therefore, when a liquid reagent of an oxidation color former such as N-(carboxymethylaminocarbonyl)-4,4'-bis(dimethylamino) diphenylamine sodium salt is needed, it is not necessary to prepare a reagent for each use. This lowers the cost of the reagent and also simplifies the operation.

The invention claimed is:

1. A method of storing N-(carboxymethylamninocarbonyl)-4,4'-bis(dimethylamino)diphenylamine sodium salt stably in a state where the N-(carboxymethylaminocarbonyl)-4,4'-bis(dimethylamino)diphenylamine sodium salt is dissolved in a solution, comprising:
preparing a solution by dissolving N-(carboxymethylaminocarbonyl-4,4'-bis(dimethylamino)diphenylamine sodium salt as well as a fructosyl amino acid oxidase and/or a peroxidase and in an aqueous solvent; and
storing the solution at a temperature in a range from 0° C. to 40° C. for at least one day;
wherein a degree of spontaneous color development of the solution stored for at least one day is suppressed to ½ or smaller relative to a case where neither the fructosyl amino acid oxidase nor the peroxidase is contained, so that the solution stored for at least one day is usable as a reagent of an oxidation color former.

2. The method according to claim 1, wherein a concentration of the N-(carboxymethylaminocarbonyl)-4,4'-bis(dimethylamino)diphenylamine sodium salt is in a range from 1 to 10,000 μmol/l.

3. The method according to claim 1, wherein a concentration of the fructosyl amino acid oxidase is in a range from 0.002 to 200 g/l.

4. The method according to claim 1, wherein a concentration of the peroxidase is in a range from 0.02 to 50 g/l.

5. The method according to claim 1, wherein the solution contains 0.01 to 200 g of the fructosyl amino acid oxidase and/or 0.02 to 50 g of the peroxidase per 0.1 mmol of N-(carboxymethylaminocarbonyl)-4,4'-bis(dimethylamino) diphenylamine sodium salt.

6. The method according to claim 1, wherein the solution contains at least one buffer selected from the group consisting of ADA buffer, Tris-HCl buffer, Bis-Tris buffer) glycylglycine buffer, Bicine buffer, and phosphate buffer.

7. The method according to claim 1, further comprising:
adding at least one antioxidant selected from the group consisting of α-tocopherol acetate (VE), potassium erythorbate, and potassium sorbate to the solution.

8. The method according to claim 1, further comprising:
adding at least one chelating agent selected from the group consisting of ethylenediaminetetraacetic acid (EDTA), diethylenetriaminepentaacetic acid (DTPA), trans-1,2-diaminocyclohexane-N,N,N',N'-tetraacetic acid (CyDTA), O,O'-bis(2-aminoethyl)ethyleneglycol-N,N,N', N'-tetraacetic acid (GEDTA), and nitrilotriacetic acid (NTA) to the solution.

9. The method according to claim 1, further comprising:
adding sodium azide to the solution.

10. The method according to claim 1, wherein a pH of the solution is in range from 5.0 to 9.0.

11. An N-(carboxymethylaminocarbonyl)-4-4'-bis(dimethylamino)diphenylamine sodium salt-containing reagent solution comprising:
N-(carboxymethylaminocarbonyl)-4,4'-bis(dimethylamino)diphenylamine sodium salt; and
a fructosyl amino acid oxidase and/or a peroxidase,
wherein at least one day at a temperature in a range from 0° C. to 40° C. has elapsed after the N-(carboxymethylaminocarbonyl)-4,4'-bis(dimethylamino)diphenylamine sodium salt as well as the fructosyl amino acid oxidase and/or the peroxidase were dissolved.

12. The method according to claim 1, wherein a concentration of the fructosyl amino acid oxidase is in a range from 0.1 to 1000 kU/l.

13. The method according to claim 1 wherein a concentration of the peroxidase is in a range from 1 to 5000 kU/l.

14. The method according to claim 1, wherein the solution contains 0.5 to 1000 kU of the fructosyl amino acid oxidase and/or 1 to 5000 kU of the peroxidase per 0.1 mmol of N-(carboxymethylaminocarbonyl)-4,4'-bis(dimethylamino) diphenylamine sodium salt.

15. A method of suppressing spontaneous color development in a liquid reagent containing N-(carboxymethylaminocarbonyl)-4,4'bis(dimethylamino)diphenylamine sodium salt, comprising:
preparing a liquid reagent by dissolving N-(carboxymethylaminocarbonyl)-4-4'-bis(dimethylamino)diphenylamine sodium salt, as well as fructosyl amino acid oxidase and/or a peroxidase, in an aqueous solvent; and utilizing the liquid reagent as a reagent of an oxidation color former after the liquid reagent is stored at a temperature in a range from 0° C. to 40° C. for at least one day after preparation.

16. A method according to claim 15, wherein a degree of spontaneous color development of the liquid reagent stored for at least one day is suppressed to ½ or smaller relative to a case where neither the fructosyl amino acid oxidase nor the peroxidase is contained, so that the liquid reagent stored for at least one day is usable as a reagent of an oxidation color former.

17. The method according to claim 15, wherein a concentration of the N-(carboxymethylaminocarbonyl)-4-4'-bis(dimethylamino)diphenylamine sodium salt in the liquid reagent is in a range of 1 to 10,000 µmol/l.

18. The method according to claim 15, wherein a concentration of the fructosyl amino acid oxidase is in a range from 0.002 to 200 g/l or from 0.1 to 1000 kU/l.

19. The method according to claim 15, wherein a concentration of the peroxidase is in a range from 0.02 to 50 g/l or from 1 to 5000 kU/l.

20. The method according to claim 15, wherein the liquid reagent contains 0.01 to 200 g or 0.5 to 1000 kU of the fructosyl amino acid oxidase and/or 0.02 to 50 g or 1 to 5000 kU of the peroxidase per 0.1 mmol of N-(carboxymethylaminocarbonyl)-4,4'-bis(dimethylamino)diphenylamine sodium salt.

21. The method according to claim 15, wherein the liquid reagent contains at least one buffer selected from the group consisting of ADA buffer, Tris-HCl buffer, Bis-Tris buffer, glycylglycine buffer, Bicine buffer, and phosphate buffer.

22. The method according to claim 15, wherein the liquid reagent further contains at least one antioxidant selected from the group consisting of α-tocopherol acetate (VE), potassium erythorbate, and potassium sorbate.

23. The method according to claim 15, wherein the liquid reagent further contains at least one chelating agent selected from the group consisting of ethylenediaminetetraacetic acid (EDTA), diethylenetriaminepentaacetic acid (DTPA), trans-1,2-diaminocyclohexane-N,N,N',N'-tetraacetic acid (Cy-DTA), O,O'-bis(2-aminoethyl)ethyleneglycol-N,N,N',N'-tetraacetic acid (GEDTA), and nitrilotriacetic acid (NTA) to the solution.

24. The method according to claim 15, wherein the liquid reagent further contains sodium azide.

25. The method according to claim 15, wherein a pH of the liquid reagent is in a range from 5.0 to 9.0.

* * * * *